(12) United States Patent
Liang et al.

(10) Patent No.: US 12,352,313 B2
(45) Date of Patent: Jul. 8, 2025

(54) BALL SPLINE WITH LUBRICATION PASSAGE

(71) Applicant: HIWIN TECHNOLOGIES CORP., Taichung (TW)

(72) Inventors: Yu-Min Liang, Taichung (TW); Hao-Ti Chuang, Taichung (TW); Shang-Hua Tsai, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 86 days.

(21) Appl. No.: 18/527,593

(22) Filed: Dec. 4, 2023

(65) Prior Publication Data

US 2025/0180073 A1      Jun. 5, 2025

(51) Int. Cl.
*F16C 29/06* (2006.01)
*F16C 33/66* (2006.01)

(52) U.S. Cl.
CPC ...... *F16C 33/6659* (2013.01); *F16C 29/0695* (2013.01); *F16C 33/664* (2013.01); *F16C 33/6681* (2013.01)

(58) Field of Classification Search
CPC .............. F16C 29/0609; F16C 29/0685; F16C 29/0695; F16C 33/6637; F16C 33/664; F16C 33/6651; F16C 33/6659; F16C 33/6681

See application file for complete search history.

(56) References Cited

U.S. PATENT DOCUMENTS

| 5,145,262 A * | 9/1992 | Morita ................ F16C 33/6696 384/49 |
| 5,695,288 A * | 12/1997 | Sugihara ............ F16C 29/0688 384/44 |
| 12,247,613 B2 * | 3/2025 | Kwon ................ F16C 29/0695 |
| 2006/0023980 A1 * | 2/2006 | Kato .................... F16C 29/0609 384/43 |
| 2019/0078681 A1 * | 3/2019 | Lin ..................... F16C 29/0695 |
| 2024/0060533 A1 * | 2/2024 | Lee ..................... F16C 29/0695 |

FOREIGN PATENT DOCUMENTS

| JP | H0673438 U | 10/1994 |
| JP | 2004036814 A | 2/2004 |
| TW | M615588 U | 8/2021 |

* cited by examiner

*Primary Examiner* — Alan B Waits
(74) *Attorney, Agent, or Firm* — Muncy, Geissler, Olds & Lowe, P.C.

(57) ABSTRACT

A ball spline includes a spline shaft, an outer sleeve, and two circulation elements. The outer sleeve is slidably sleeved on the spline shaft to form a load channel therebetween for installation of balls, and has an oil guide channel inside. The circulation elements are mounted to two outer end surfaces of the outer sleeve and each has an oil filling hole, an oil storage tank communicating with the oil filling hole, the load channel, and the oil guide channel, and an oil guide portion disposed in the oil storage tank and corresponding to the oil filling hole and protruding towards the oil guide channel. Thus, after injecting lubricant into the oil filling hole of one of the circulation elements, the lubricant lubricates the balls on both sides by means of the oil guide portion and the oil guide channel, thus enhancing the lubrication effect.

9 Claims, 13 Drawing Sheets

BALL SPLINE WITH LUBRICATION PASSAGE

BACKGROUND OF THE INVENTION

1. Field of the Invention

The present invention relates to ball splines and more particularly, to a ball spline that has a lubrication passage therein.

2. Description of the Related Art

TW M615588 discloses a ball spline that includes a sleeve and two end covers mounted to two ends of the sleeve. The sleeve has a metal body and two plastic retainers. The metal body has two through oil passages. The plastic retainers are disposed on the metal body, and the outer edge of each of the plastic retainers has an internal oil passage. The internal oil passage and the through oil passage communicate with each other to form a transmission oil passage. As such, the lubricant can flow from the through oil passage to the internal oil passage, and then along the internal oil passage through an extended oil passage to the end covers, so that the balls passing through the end covers can be lubricated.

However, in the aforesaid prior art, the outer edge of the plastic retainer is closely attached to the inner surface of the metal body. Once the oil injection pressure is too high, the outer edge of the plastic retainer may be pushed away from the inner surface of the metal body, thus causing oil leakage.

SUMMARY OF THE INVENTION

It is one objective of the present invention to provide a ball spline, which can achieve a two-sided lubrication effect without causing oil leakage.

To achieve the above objective, the ball spline of the present invention comprises a spline shaft, an outer sleeve, two circulation elements, and multiple balls. An outer surface of the spline shaft has a first rolling groove. The outer sleeve is slidably sleeved on the spline shaft and has a second rolling groove at an inner surface thereof. A load channel is formed between the second rolling groove of the outer sleeve and the first rolling groove of the spline shaft. In addition, the outer sleeve has a non-load channel and an oil guide channel inside. Two ends of the non-load channel and two ends of the oil guide channel pass through two opposite outer end surfaces of the outer sleeve. The circulation elements are mounted to the two outer end surfaces of the outer sleeve and penetrated by the spline shaft. Each of the circulation elements has a circulation groove, an oil filling hole, an oil storage tank, and an oil guide portion. Two ends of the circulation groove are connected with the load channel and the non-load channel to form a circulation channel for circulation of the balls. The oil storage tank communicates with the oil filling hole, the load channel, and the oil guide channel of the outer sleeve. The oil guide portion is disposed in the oil storage tank and corresponds to the oil filling hole and protrudes towards the oil guide channel for guiding the lubricant flow from the oil filling hole through the oil storage tank into the oil guide channel.

It can be seen from the above that when the lubricant is injected into the oil filling hole of one of the circulation elements, the lubricant flows into the load channel through the oil storage tank to lubricate the balls on one side. Meanwhile, the lubricant is guided by the oil guide portion into the oil guide channel, and then flows along the oil guide channel to the oil storage tank of the other circulation element, and then flows into the other load channel to lubricate the ball on the other side. In other words, by means of arrangement of the oil guide channel of the outer sleeve and the oil guide portions of the circulation elements, as long as the lubricant is injected into one of the oil filling holes, the balls on both sides are lubricated, thus achieving the purpose of enhancing lubrication effect. In addition, since the oil guide channel is provided inside the outer sleeve, it can withstand a larger oil injection pressure without causing oil leakage problem.

Preferably, each of the oil guide portions has a first end connected with a periphery wall of the oil storage tank, a second end arranged adjacent to the oil guide channel, and a guide bevel surface facing the oil filling hole and tilting downwards from the first end towards the second end, and further, the position of the guide bevel surface is higher than the bottom surface of the oil guide channel. In this way, the lubricant can be guided more efficiently into the oil guide channel.

Preferably, each of the oil guide portions has a width decreasing gradually from the first end towards the second end. In this way, the lubricant flows down into the load channel more efficiently.

Preferably, a width of the second end of each of the oil guide portions is smaller than or equal to a width of the oil guide channel. In this way, the lubricant flows into the oil guide channel more efficiently.

Preferably, a depression is provided at each of two opposite sides of each of the oil guide portions for reducing the possible backflow situation caused by the lubricant flowing from the oil guide channel to the oil guide portion, and allowing the lubricant to flow down into the load channel more efficiently.

Preferably, each of the two end surfaces of the outer sleeve has a lubrication channel communicating with the second rolling groove and the oil storage tank. In this way, the lubricant flows downwards from each oil guide portion to the lubrication channel, and then flows along the lubrication channel into two of the load channels.

Preferably, the lubrication channel is closer to the spline shaft than the oil guide channel.

Preferably, the oil guide channel extends along an axial direction of the spline shaft.

Other advantages and features of the present invention will be fully understood by reference to the following specification in conjunction with the accompanying drawings, in which like reference signs denote like components of structure.

BRIEF DESCRIPTION OF THE DRAWINGS

FIG. 9b is a plane view of FIG. 9a.

FIG. 10b is a plane view of FIG. 10a.

FIG. 11b is a plane view of FIG. 11a.

FIG. 12b is a plane view of FIG. 12a.

FIG. 13b is a plane view of FIG. 13a.

DETAILED DESCRIPTION OF THE INVENTION

Figure 1:
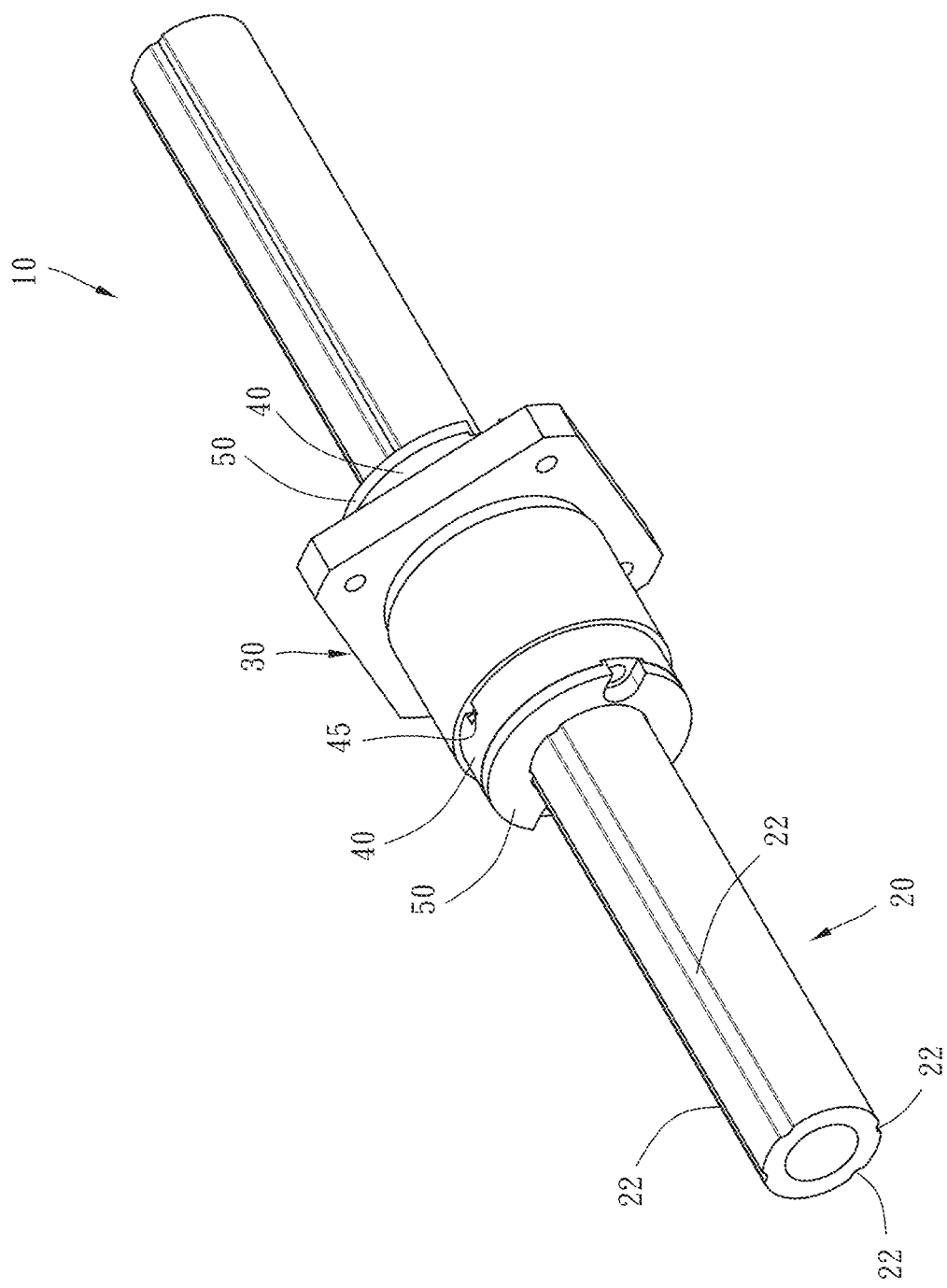
FIG. 1 is a perspective view of a ball spline of the present invention.
Figure 2:
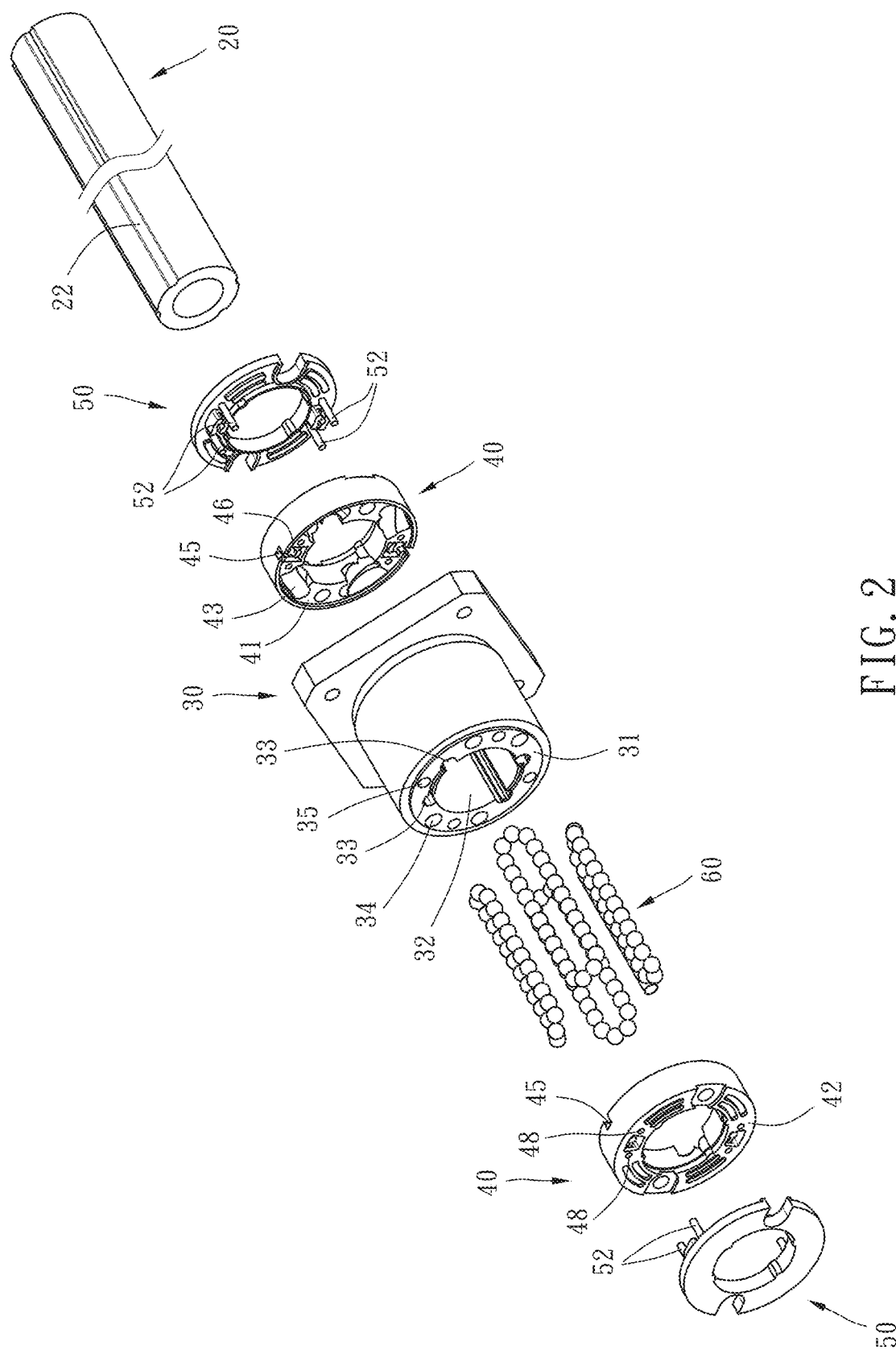
FIG. 2 is an exploded view of the ball spline of the present invention.

Referring to FIGS. 1 and 2, a ball spline 10 of the present invention comprises a spline shaft 20, an outer sleeve 30, two circulation elements 40, two dustproof elements 50, and a plurality of balls 60.

The outer surface of the spline shaft 20 has two pairs of first rolling grooves 22. Each of the first rolling grooves 22 extends along an axial direction of the spline shaft 20.

Figure 3:
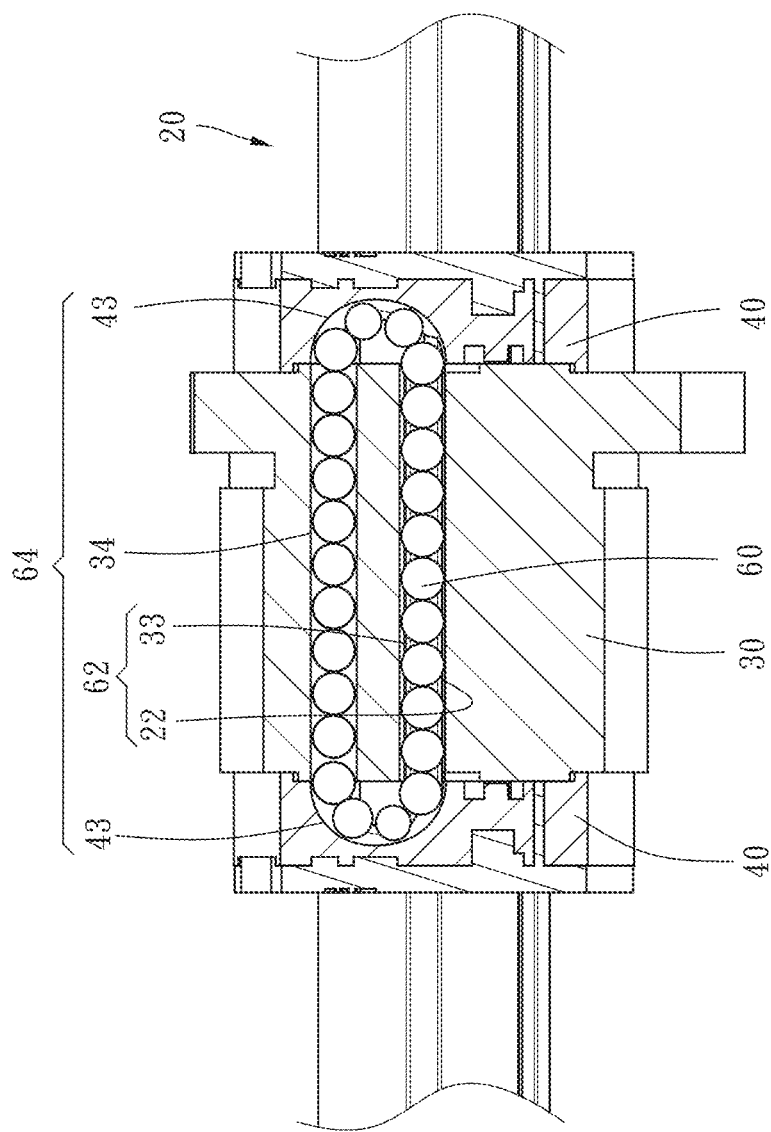
FIG. 3 is a sectional view of the ball spline of the present invention.
Figure 4:
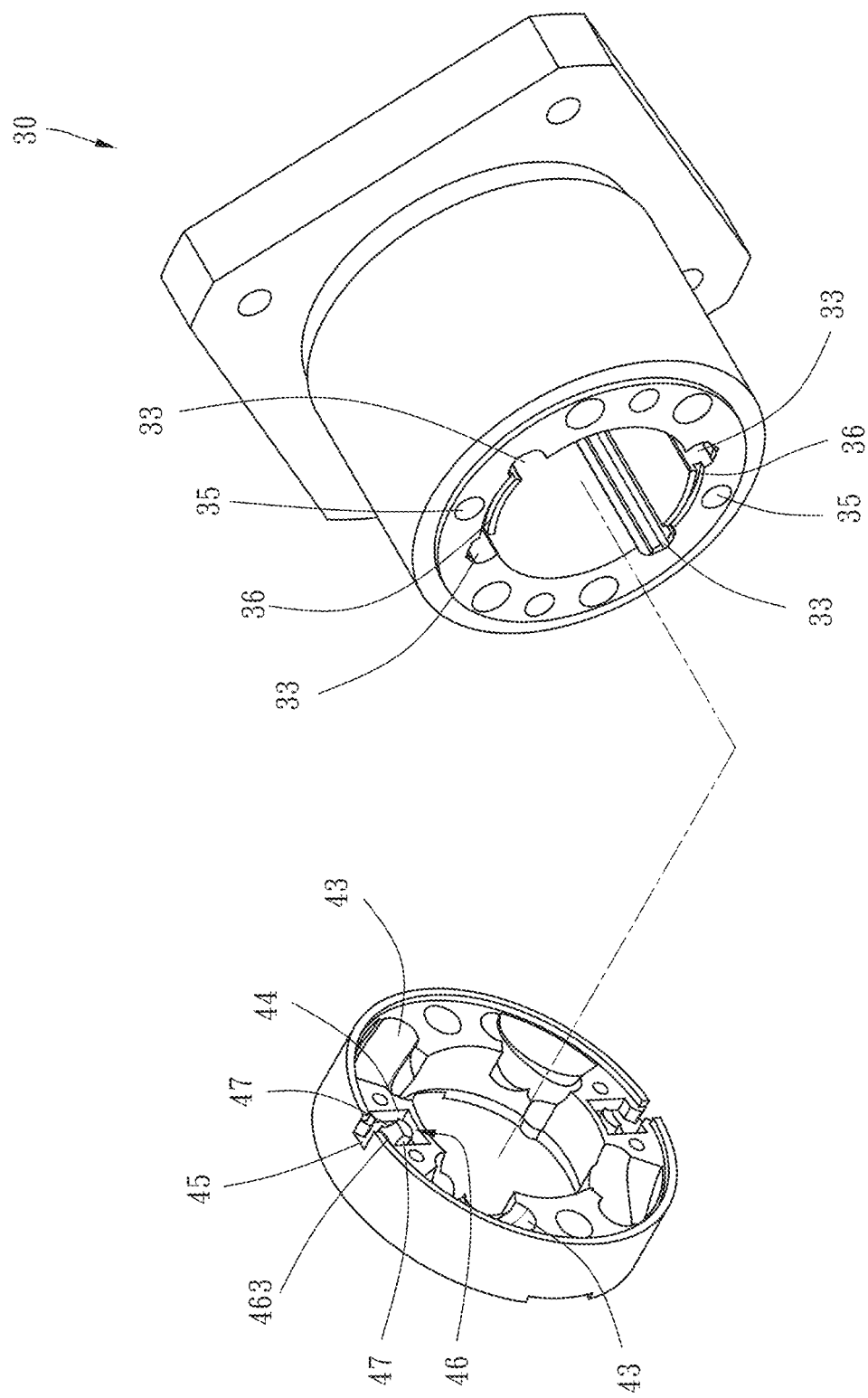
FIG. 4 is an exploded view of the outer sleeve and the circulation element provided by the ball spline of the present invention.
Figure 5:
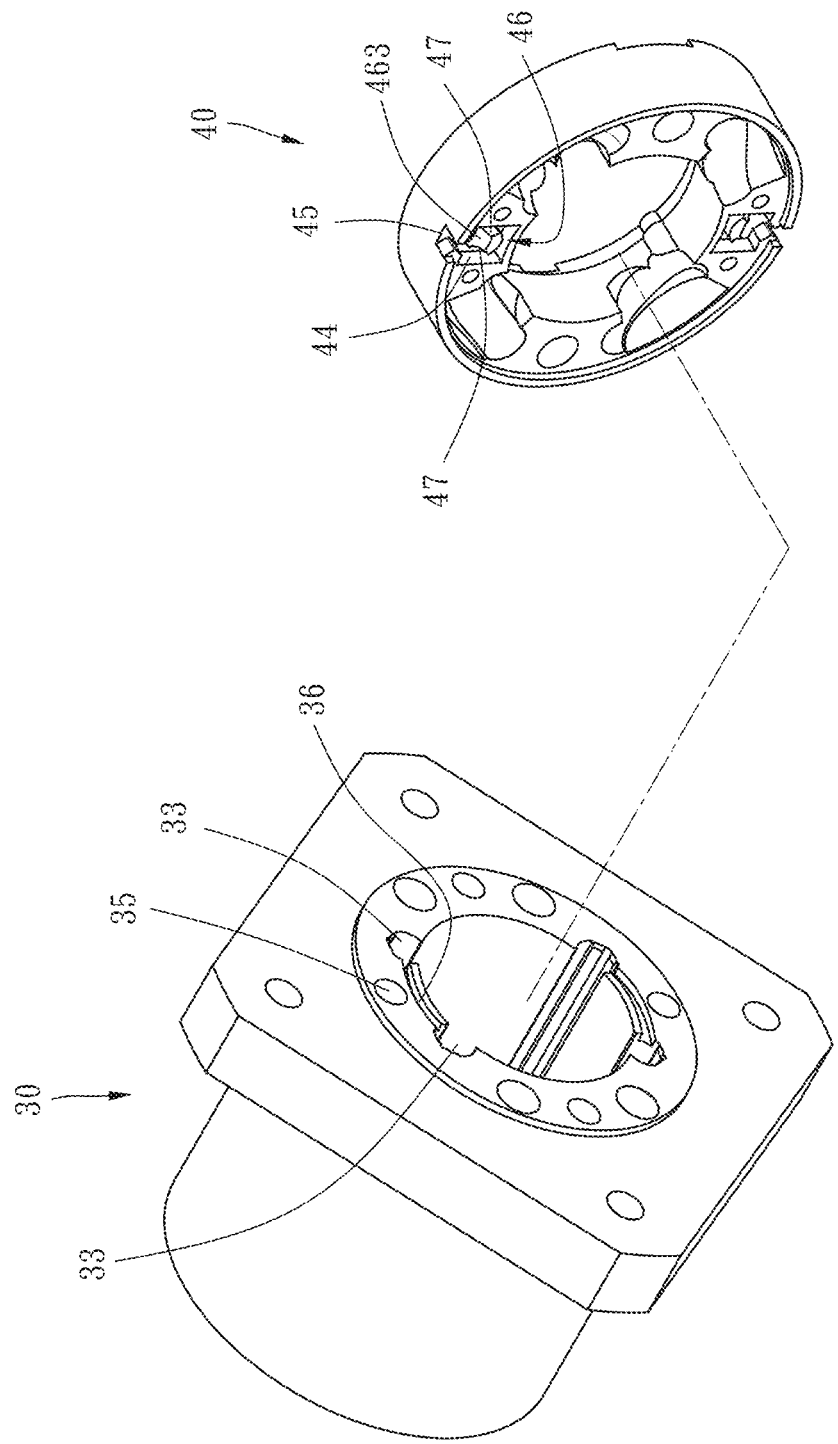
FIG. 5 is an exploded view from another perspective of the outer sleeve and the circulation element provided by the ball spline of the present invention.

The outer sleeve 30 has two opposite outer end surfaces 31 and a shaft hole 32 passing through the outer end surfaces 31. The outer sleeve 30 is sleeved on the spline shaft 20 through the shaft hole 32 and slidable along the axial direction of the spline shaft 20. The periphery wall of the shaft hole 32 has two pairs of second rolling grooves 33. The second rolling groove 33 of the outer sleeve 30 and the first rolling groove 22 of the spline shaft 20 correspond to each other to form a load channel 62 (as shown in FIG. 3). In addition, the outer sleeve 30 further has two pairs of non-load channels 34 and two oil guide channels 35. The non-load channels 34 and the oil guide channels 35 extend along the axial direction of the spline shaft 20 and pass through the outer end surfaces 31 of the outer sleeve 30. As shown in FIGS. 4 and 5, each of the outer end surfaces 31 of the outer sleeve 30 has two opposite lubrication channels 36. The lubrication channel 36 is closer to the spline shaft 20 than the oil guide channel 35, and two ends of the lubrication channel 36 are connected with one pair of the second rolling grooves 33.

Figure 6:
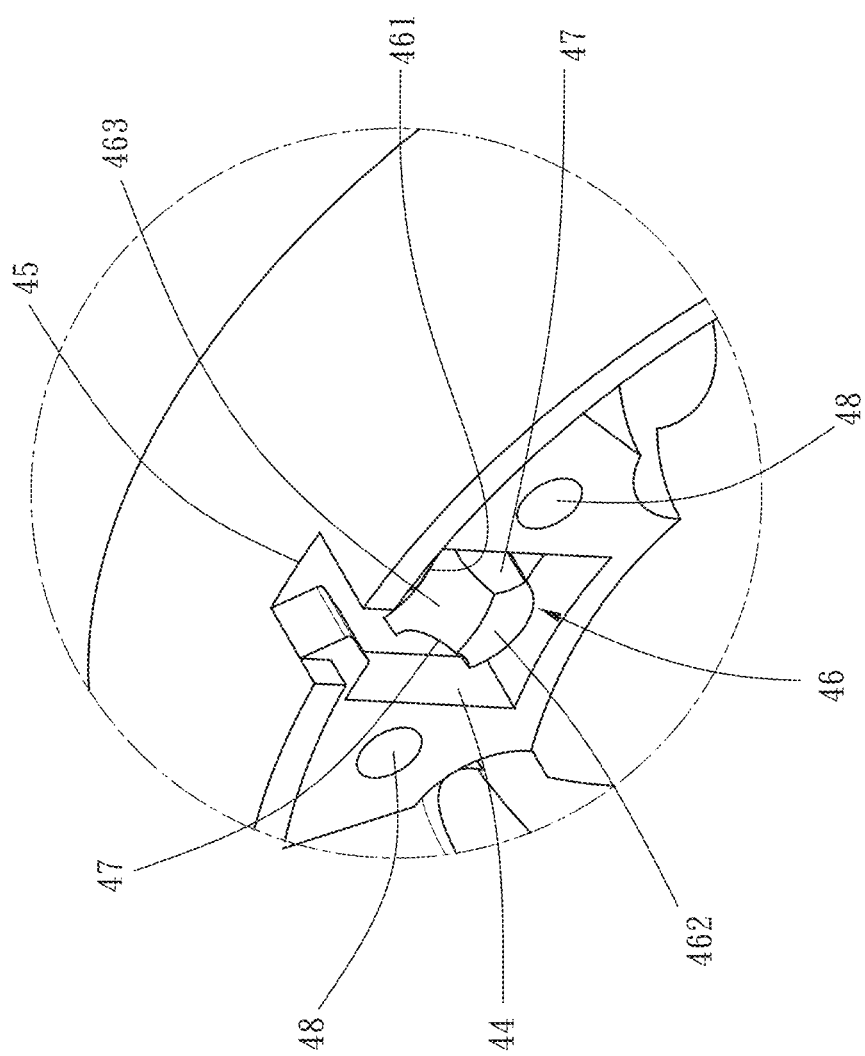
FIG. 6 is a partially enlarged view of the circulation element provided by the ball spline of the present invention.
Figure 7:
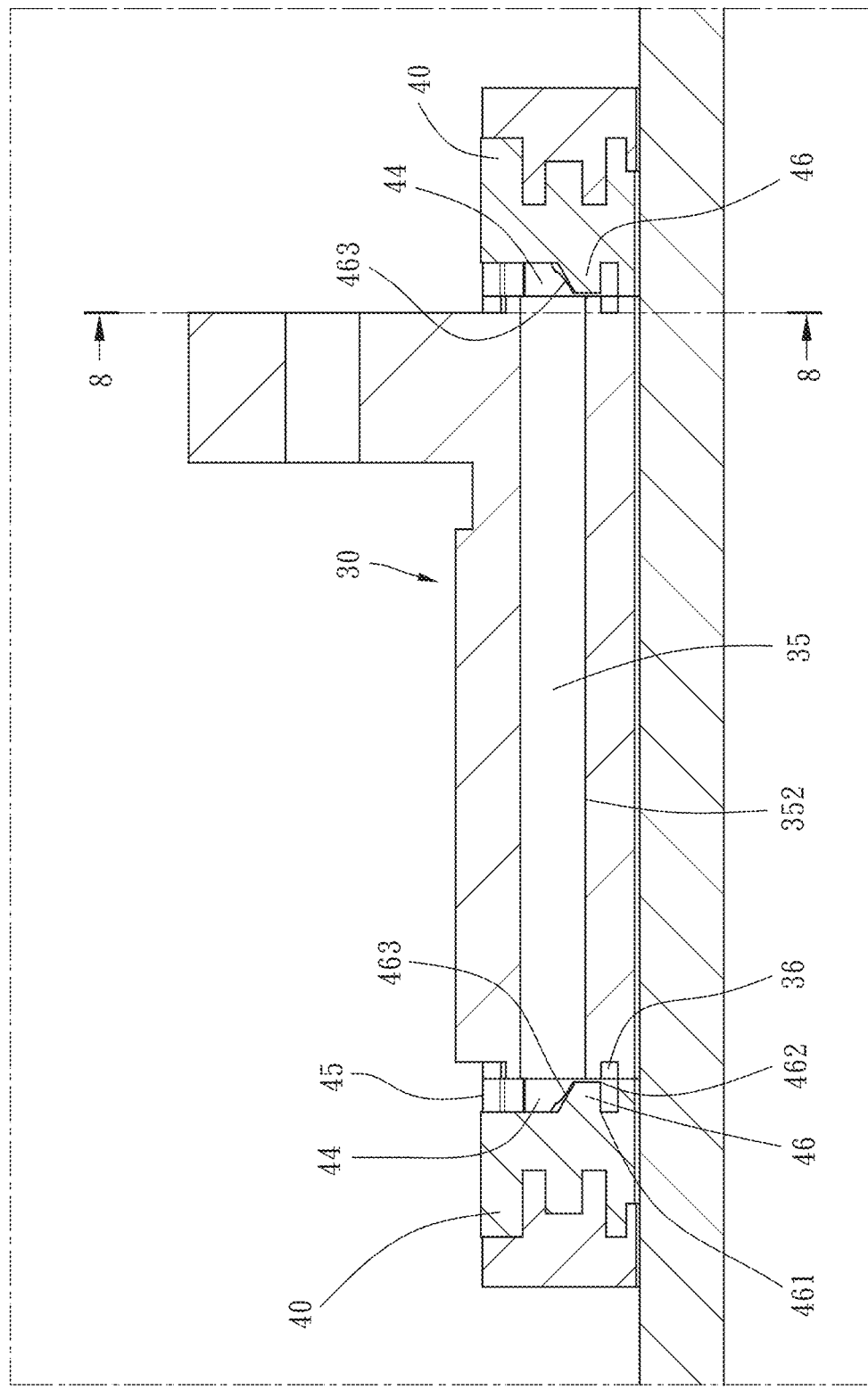
FIG. 7 is a partially sectional view of the ball spline of the present invention.
Figure 8:
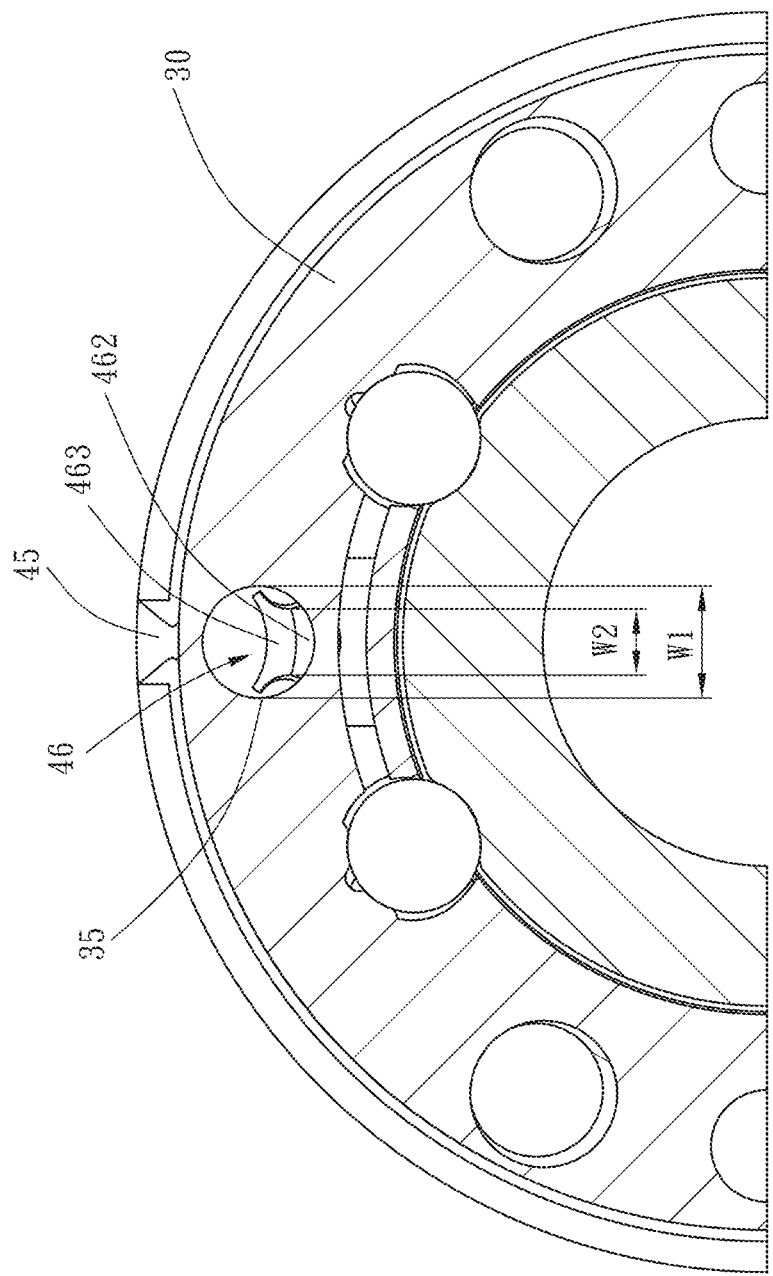
FIG. 8 is a sectional view taken along line 8-8 of FIG. 7.

The circulation elements 40 are mounted to the outer end surfaces 31 of the outer sleeve 30 and penetrated by the spline shaft 20. Each of the circulation elements 40 has an inner end surface 41 facing towards the outer sleeve 30 and an outer surface 42 facing away the outer sleeve 30. As shown in FIGS. 2, 4, and 5, the inner end surface 41 has four circulation grooves 43 and two opposite oil storage tanks 44. Two ends of each circulation groove 43 are connected with the load channel 62 and the non-load channel 34 to form a circulation channel 64 (see FIG. 3) for circulation of the balls 60. The oil storage tank 44 axially communicates with the oil guide channel 35 of the outer sleeve 30 and radially communicates with the lubrication channel 36 of the outer sleeve 30 (see FIGS. 4, 5, and 7). As shown in FIGS. 4 and 5, the outer surface of the circulation element 40 has two opposite oil filling holes 45 radially communicating with the oil storage tanks 44, respectively. In addition, as shown in FIGS. 6 and 7, each of the circulation elements 40 has two oil guide portions 46 disposed in the oil storage tanks 44, respectively, and protruding towards the oil guide channels 35, and further, each of the oil guide channels 35 corresponds to one of the oil filling holes 45, one of the oil storage tanks 44, and one of the oil guide portions 46. Furthermore, the oil guide portion 46 has a first end 461, a second end 462, and a guide bevel surface 463. The first end 461 is connected with the periphery wall of the oil storage tank 44. The second end 462 is arranged adjacent to the oil guide channel 35, and the width W2 of the second end 462 is smaller than or equal to the width W1 of the oil guide channel 35 (see FIG. 8). The guide bevel surface 463 faces the oil filling hole 45 and tilts downwards from the first end 461 towards the second end 462, and further, the position of the guide bevel surface 463 is higher than the bottom surface 352 of the oil guide channel 35 (see FIG. 7). As shown in FIGS. 6, the oil guide portion 46 has a width decreasing gradually from the first end 461 towards the second end 462, and each of two opposite sides of the oil guide portion 46 has an arc-shaped depression 47. In addition, as shown in FIG. 2, a positioning hole 48 passing through the inner and outer end surfaces 41, 42 is provided at each of two opposite sides of the oil storage tank 44.

Each of the dustproof elements 50 has two pairs of positioning posts 52 at an inner end surface thereof. The dustproof elements 50 uses the positioning posts 52 to insert into the positioning holes 48 of the circulation element 40 and uses screws (not shown) to secure the circulation elements 40 and the outer sleeve together.

It can be seen from the above that when the lubricant is injected into the oil filling hole 45 of the circulation element 40 on one side, as shown in FIG. 7, the lubricant flows down to the lubrication channel 36 through the oil storage tank 44 on the same side, and then flows into the load channel 62 to lubricate the balls 60 on the same side. In another aspect, a part of the lubricant is guided into the oil guide channel 35 by the oil guide portion 46, and then flows along the oil guide channel 35 to the oil storage tank 44 on the other side, and then flows down to the lubrication channel 36, and then flows to the load channels 62 on the other side to lubricate the ball 60 on the other side. During the flow of the lubricant, through the guidance of the guide bevel surface 463 and the size design of W2≤W1, the lubricant can enter the oil guide channel 35 from the oil storage tank 44 more concentratedly and efficiently. In addition, through the depressions 47 on both sides of the oil guide portion 46, the backflow situation caused by the lubricant flowing from the oil guide channel 35 to the guide bevel surface 463 of the oil guide portion 46 can be reduced, so that the lubricant can flow to the other side more efficiently. Further, through the tapered width of the oil guide portion 46 and the depressions 47 on both sides of the oil guide portion 46, the lubricant can flow down from the oil storage tank 44 to the lubrication channel 36 more efficiently.

Figure 9A:
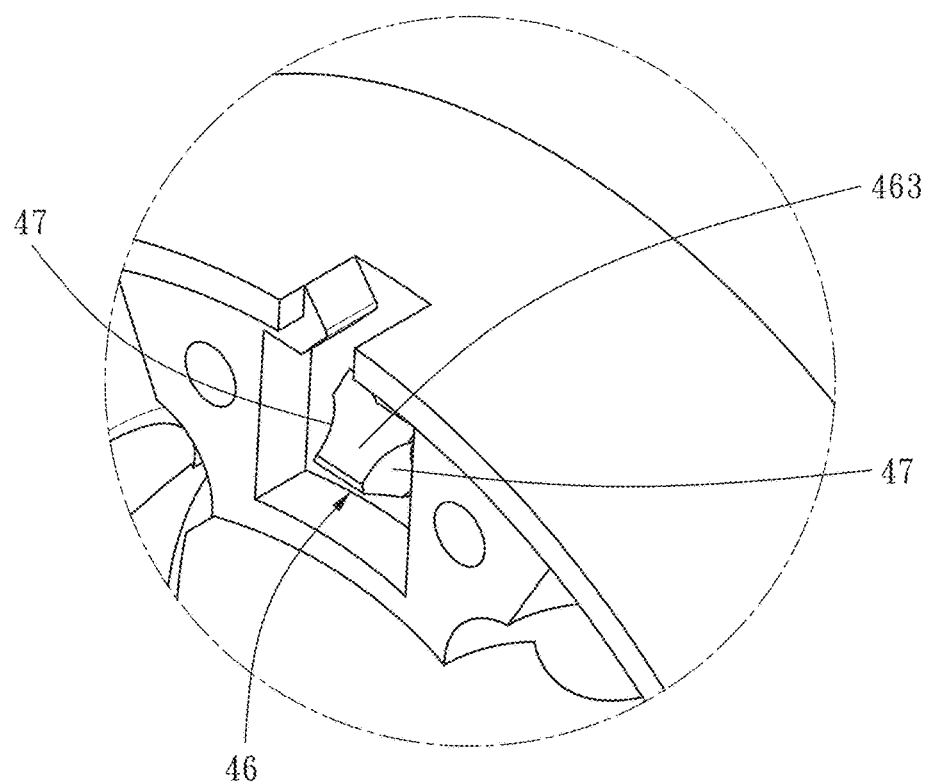
FIG. 9a is similar to FIG. 6, showing the circulation element with another configuration.
Figure 9B:
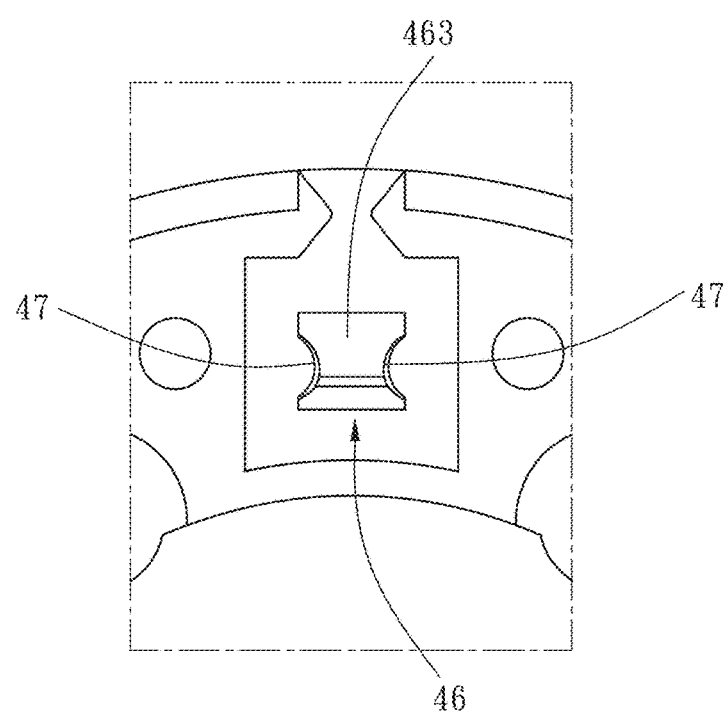
Figure 10A:
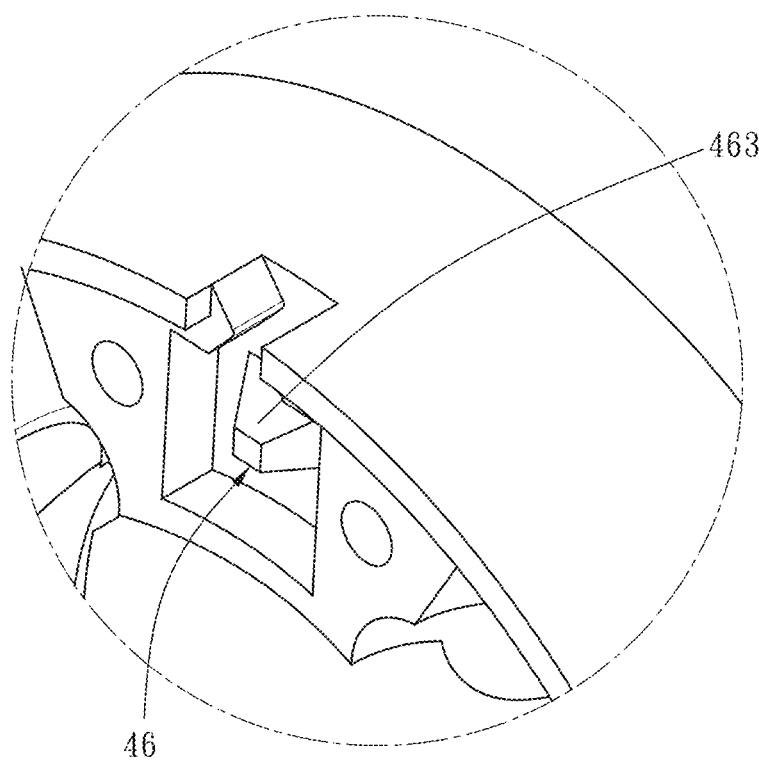
FIG. 10a is similar to FIG. 9a, showing the circulation element with another configuration.
Figure 10B:
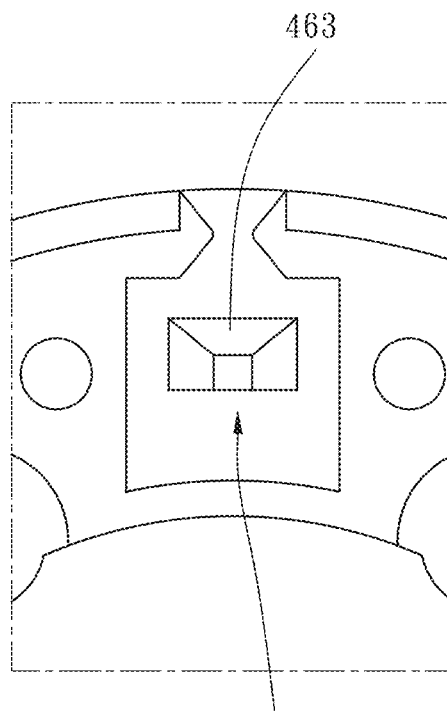
Figure 11A:
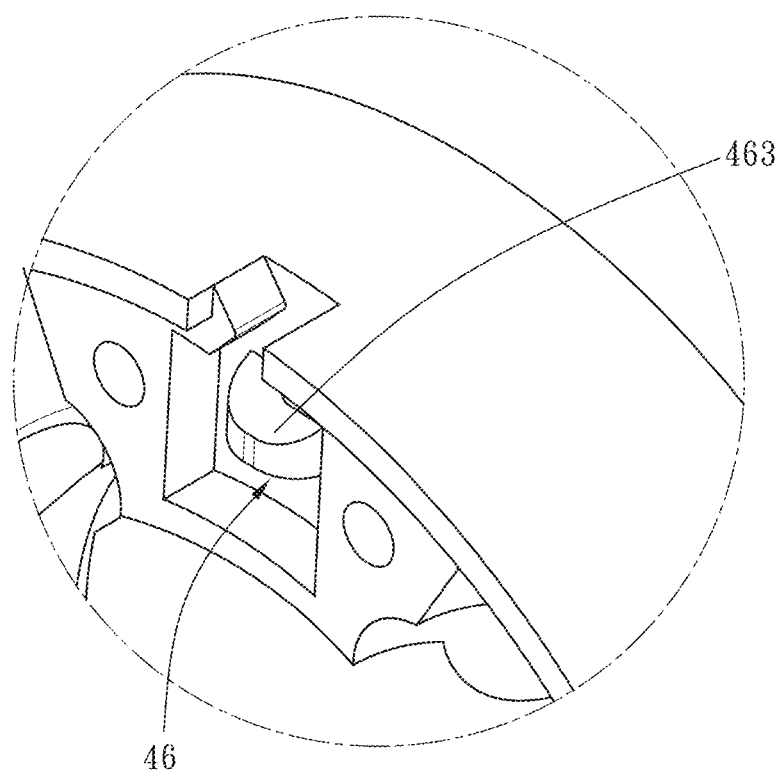
FIG. 11a is similar to FIG. 10a, showing the circulation element with another configuration.
Figure 11B:
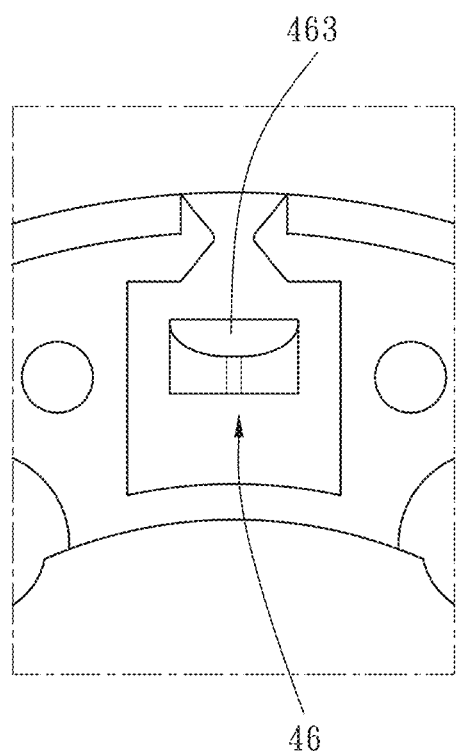
Figure 12A:
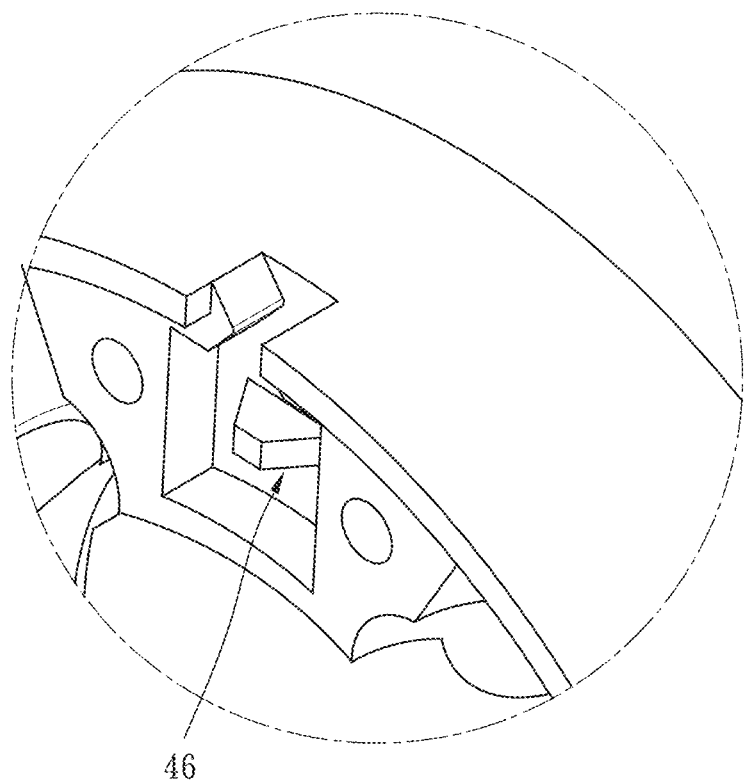
FIG. 12a is similar to FIG. 11a, showing the circulation element with another configuration.
Figure 12B:
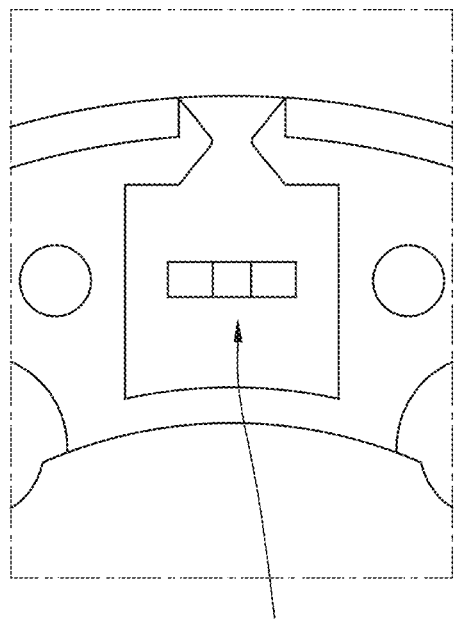
Figure 13A:
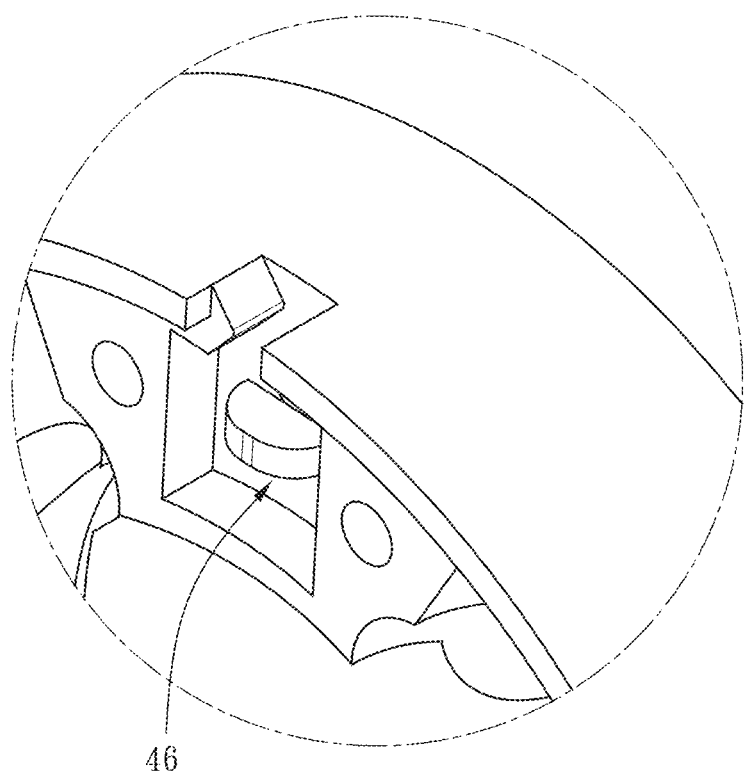
FIG. 13a is similar to FIG. 12a, showing the circulation element with another configuration.
Figure 13B:
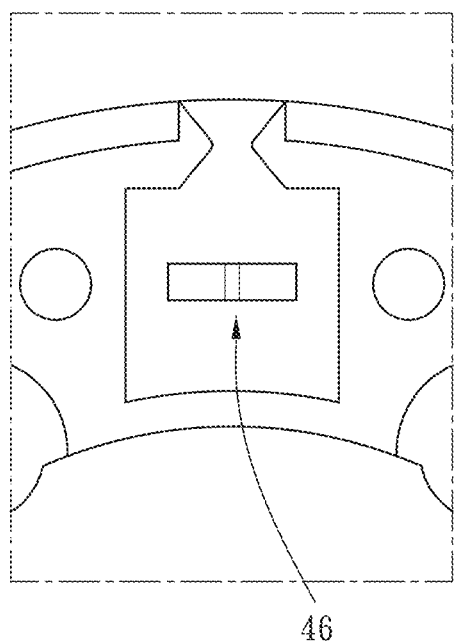

What needs to be supplemented here is that the configuration of the oil guide portion 46 can be changeable according to actual needs. For example, the oil guide portion 46 can be designed in a pointed cone shape as shown in FIGS. 9a and 9b. The oil guide portion 46 in FIGS. 9a and 9b still has the guide bevel surface 463 and the depressions 47; alternatively, the oil guide portion 46 can also be designed in a truncated square pyramid shape as shown in FIGS. 10a and 10b or an arc shape as shown in FIGS. 11a and 11b. The oil guide portion 46 in FIGS. 10a, 10b, 11a, and 11b has the guide bevel surface 463 but omits the depressions 47; alternatively, the oil guide portion 46 can also be designed in a truncated square pyramid shape as shown in FIGS. 12a and 12*b* or an arc shape as shown in FIGS. 13*a* and 13*b*. The oil guide portion 46 in FIGS. 12*a*, 12*b*, 13*a*, and 13*b* omits the guide bevel surface 463 and the depressions 47. However, regardless of the above configuration, the oil guide portion 46 can provide a guiding and steering function for the lubricant, so that a part of the lubricant can smoothly enter the oil guide channel 35 to provide a lubricating effect for the ball 60 on the other side.

As indicated above, through the arrangement of the oil guide channel 35 of the outer sleeve 30 and the oil guide portion 46 of the circulation element 40. As long as the lubricant is injected into the oil filling hole 45 on one side, the balls 60 on both sides can be lubricated to achieve the effect of two-sided lubrication, thereby achieving the purpose of enhancing lubrication efficiency. In addition, since the oil guide channel 35 is provided inside the outer sleeve 30 and passes through the outer sleeve 30 along the axial direction of the spline shaft 20, it can withstand a larger oil injection pressure without causing oil leakage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ball spline comprising:
   a spline shaft having a first rolling groove at an outer surface thereof;
   an outer sleeve slidably sleeved on the spline shaft and having a second rolling groove at an inner surface thereof, the second rolling groove of the outer sleeve and the first rolling groove of the spline shaft forming a load channel, the outer sleeve having a non-load channel and an oil guide channel inside, two ends of the non-load channel and two ends of the oil guide channel passing through two opposite end surfaces of the outer sleeve;
   two circulation elements mounted to the two end surfaces of the outer sleeve and penetrated by the spline shaft, the circulation elements each having a circulation groove with two ends thereof connected with the load channel and the non-load channel to form a circulation channel, an oil filling hole, an oil storage tank communicating with the oil filling hole, the load channel, and the oil guide channel of the outer sleeve, and an oil guide portion disposed in the oil storage tank and corresponding to the oil filling hole and protruding towards the oil guide channel; and
   a plurality of balls disposed in the circulation channel.

2. The ball spline as claimed in claim 1, wherein each of the oil guide portions has a first end connected with a periphery wall of the oil storage tank, a second end arranged adjacent to the oil guide channel, and a guide bevel surface facing the oil filling hole and tilting downwards from the first end towards the second end and having a position higher than a bottom surface of the oil guide channel.

3. The ball spline as claimed in claim 2, wherein each of the oil guide portions has a width decreasing from the first end towards the second end.

4. The ball spline as claimed in claim 3, wherein a width of the second end of each of the oil guide portions is smaller than or equal to a width of the oil guide channel.

5. The ball spline as claimed in claim 1, wherein a depression is provided at each of two opposite sides of each of the oil guide portions.

6. The ball spline as claimed in claim 1, wherein each of the two end surfaces of the outer sleeve has a lubrication channel communicating with the second rolling groove and the oil storage tank.

7. The ball spline as claimed in claim 6, wherein the lubrication channel is closer to the spline shaft than the oil guide channel.

8. The ball spline as claimed in claim 1, wherein the oil guide channel extends along an axial direction of the spline shaft.

9. The ball spline as claimed in claim 1, wherein each of the oil guide portions has a pointed cone shape, truncated square pyramid shape or arc shape.

* * * * *